US012548818B2

(12) United States Patent
Juan et al.

(10) Patent No.: US 12,548,818 B2
(45) Date of Patent: Feb. 10, 2026

(54) BATTERY ASSEMBLIES

(71) Applicant: Relyion Energy Inc., Fremont, CA (US)

(72) Inventors: Aaron Daniel Juan, Santa Barbara, CA (US); Surinder Singh, Fremont, CA (US); Ratnesh K. Sharma, Fremont, CA (US)

(73) Assignee: Relyion Energy Inc., Fremont, CA (US)

( * ) Notice: Subject to any disclaimer, the term of this patent is extended or adjusted under 35 U.S.C. 154(b) by 631 days.

(21) Appl. No.: 18/052,468

(22) Filed: Nov. 3, 2022

(65) Prior Publication Data

US 2024/0154198 A1 May 9, 2024

(51) Int. Cl.
*H01M 10/613* (2014.01)
*H01M 10/653* (2014.01)
*H01M 10/6552* (2014.01)
*H01M 10/6567* (2014.01)
*H01M 50/505* (2021.01)
*H01M 50/514* (2021.01)
*H01M 50/507* (2021.01)

(52) U.S. Cl.
CPC ....... *H01M 10/613* (2015.04); *H01M 10/653* (2015.04); *H01M 10/6552* (2015.04); *H01M 10/6567* (2015.04); *H01M 50/505* (2021.01); *H01M 50/514* (2021.01); *H01M 50/507* (2021.01)

(58) Field of Classification Search
CPC ............. H01M 10/613; H01M 10/653; H01M 10/6552; H01M 10/6567; H01M 50/505; H01M 50/507; H01M 50/514
See application file for complete search history.

(56) References Cited

U.S. PATENT DOCUMENTS

| 4,581,570 A | * | 4/1986 | Mejia | .................... H01M 50/50 320/103 |
| 2009/0246606 A1 | * | 10/2009 | Shimizu | ............ H01M 10/6569 429/62 |
| 2016/0359206 A1 | * | 12/2016 | Eberleh | ............... H01M 10/425 |
| 2024/0106065 A1 | * | 3/2024 | Hidaka | .................. H01G 11/10 |

* cited by examiner

*Primary Examiner* — Lingwen R Zeng
(74) *Attorney, Agent, or Firm* — Morrison & Foerster LLP

(57) ABSTRACT

A battery assembly can include a backplane comprising a plurality of socket blocks configured to electrically couple respectively to a plurality of battery components. The socket blocks may provide a flexible connection between the battery components and the backplane that allows individual battery components to be replaced without removing entire modules from service. Additionally, the backplane may include a sliding bus bar that controls the electrical connection topology between the socket blocks as it is moved between a first position and a second position with respect to the socket blocks. The backplane may also be configured to connect to a cooling system for the battery components so that the temperature of the battery components can be regulated.

24 Claims, 10 Drawing Sheets

BATTERY ASSEMBLIES

FIELD

The present disclosure relates generally to battery assembly architecture, and more particularly to battery assembly architectures using backplanes and/or bus bars that provide flexibility and hot-swappable functionality.

BACKGROUND

Battery assemblies may include a plurality of battery modules, each of which may include a plurality of cells. Factors including manufacturing variances, cell/module age, and chemical impurities may cause variations in the capacities of the modules and cells. As a result, the modules and cells may degrade at different rates, and/or may malfunction at different times with respect to one another. Maintenance (e.g., cell balancing or cell/module replacement) may be required to address the malfunctioning or degraded component.

SUMMARY

Known battery assembly architectures lack flexibility that is required for efficiently addressing degrading and/or malfunctioning components. In particular, known battery assembly architectures are not hot-swappable, meaning individual components of a module cannot be removed from the module without removing the entire module from service. In known systems, as batteries degrade, capacity augmentation may be done in large chunks, which may lead to higher capacity maintenance costs. For example, when a single cell malfunctions, an entire battery module may need to be removed from service to perform maintenance. Such measures add to the cost of servicing energy storage and may lead to wasting cells that have not malfunctioned or degraded.

Accordingly, there is a need for improved systems and methods for providing flexible and hot-swappable battery assembly architectures. Provided herein are battery assembly architectures that may address the above-identified needs. More specifically, the present disclosure provides battery assembly architectures comprising backplanes configured to allow for components of the battery assembly to be hot-swapped. In some embodiments, a backplane may provide an electrical connection to one or more battery modules and/or one or more battery cells. The electrical connection may be flexible, allowing battery components to be individually hot-swapped. In some embodiments, the backplane may comprise one or more movable bus bars configured to control the electrical topology (series or parallel) of the backplane. These components may allow the battery assembly to be easily and efficiently balanced. In some embodiments, the backplane may comprise cooling mechanisms configured to regulate the temperature of the battery terminals that are electrically coupled to the backplane.

In some embodiments, a backplane may comprise a plurality of socket blocks configured to electrically couple respectively to a plurality of battery components and a sliding bus bar configured to be movable between a first position with respect to the plurality of socket blocks and a second position with respect to the plurality of socket blocks, wherein, when the sliding bus bar is in the first position, the plurality of socket blocks are electrically coupled to one another in a first electrical configuration, and when the sliding bus bar is in the second position, the plurality of socket blocks are electrically coupled to one another in a second electrical configuration.

In some embodiments, the plurality of socket blocks are electrically coupled to one another in the first electrical configuration, one or more of the plurality of socket blocks are electrically coupled in series.

In some embodiments, when the plurality of socket blocks are electrically coupled to one another in the second electrical configuration, one or more of the plurality of socket blocks are electrically coupled in parallel.

In some embodiments, the backplane comprises a plurality of through-holes configured to receive a plurality of coolant pipes configured to provide a flow path for a coolant, wherein the plurality of coolant pipes are configured to thermally couple to corresponding coolant pipes in one or more of the plurality of battery components.

In some embodiments, the plurality of coolant pipes comprise a thermally conductive material.

In some embodiments, the plurality of coolant pipes comprise copper.

In some embodiments, the coolant comprises a single-phase fluid.

In some embodiments, the coolant comprises a two-phase fluid.

In some embodiments, wherein one or more of the plurality of through-holes comprises a valve configured to close to prevent flow of coolant when a socket block corresponding to the valve is not electrically coupled to a battery component and configured to open to allow flow of coolant when the socket block is electrically coupled to the battery component.

In some embodiments, one or more of the plurality of socket blocks comprises a plurality of sockets configured to receive terminals of one or more of the plurality of battery components.

In some embodiments, the backplane comprises one or more flexible members positioned within one or more of the plurality of sockets, wherein the one or more flexible members are configured to provide a flexible contact area between the terminals of one or more of the plurality of battery components and the backplane.

In some embodiments, the one or more flexible members comprise leaf springs.

In some embodiments, when a terminal of the plurality of battery components is removed from a socket of the plurality of sockets, the flexible member positioned within the socket is configured to electrically connect an electrical connection across the socket block.

In some embodiments, a first socket block of the plurality of socket blocks comprises sockets that open in a first direction and a second socket block of the plurality of socket blocks comprises sockets that open in the first direction such that battery components whose terminals are inserted into the sockets of the first socket block face the same direction as battery components whose terminals are inserted into the sockets of the second socket block.

In some embodiments, the slidable bus bar is positioned between the first socket block and the second socket block.

In some embodiments, the first socket block and the second socket block are positioned in a first plane.

In some embodiments, the slidable bus bar is positioned in the first plane with the first socket block and the second socket block.

In some embodiments, a first socket block of the plurality of socket blocks comprises sockets that open in a first direction and a second socket block of the plurality of socket blocks comprises sockets that open in a second direction such that battery components whose terminals are inserted into the sockets of the first socket block face in an opposite direction to battery components whose terminals are inserted into the sockets of the second socket block.

In some embodiments, the first socket block is positioned in a first plane and the second socket block is positioned in a second plane.

In some embodiments, the slidable bus bar is positioned in a third plane and is configured to form an electrical connection between the first plane and the second plane.

In some embodiments, the slidable bus bar comprises a first set of electrical connectors configured to electrically couple one or more of the plurality of socket blocks when the slidable bus bar is in the first position and a second set of electrical connectors configured to electrically couple one or more of the plurality of socket blocks when the slidable bus bar is in the second position.

In some embodiments, when the sliding bus bar is moved from the first position to the second position, the sliding bus bar occupies a third position with respect to the plurality of socket blocks wherein the plurality of socket blocks are not electrically coupled to one another.

BRIEF DESCRIPTION OF THE FIGURES

The following figures show various battery assembly architectures comprising backplanes and/or associated components of the backplanes. The battery assembly architectures shown in the figures may, in some embodiments, have any one or more of the characteristics described herein.

DETAILED DESCRIPTION

Provided herein are battery assembly architectures configured to allow for hot-swappability of components of the battery assembly. As mentioned above, a battery assembly may comprise one or more battery modules. A battery module may, in turn, comprise one or more electrochemical cells. Battery modules and electrochemical cells may be referred to hereinafter as "battery components". In some embodiments, the battery assembly architectures of the present disclosure may allow for efficient hot-swapping and balancing of battery components that constitute the battery assembly. In some embodiments, the battery assembly architectures of the present disclosure may comprise mechanisms for regulating battery assembly temperature.

In some embodiments, a battery assembly architecture may comprise a backplane. The backplane may provide an electrical connection to one or more battery components (e.g., through one or more socket blocks configured to electrically couple to module or cell terminals). In some embodiments, the backplane may comprise one or more movable bus bars configured to control the electrical topology (series or parallel) of the backplane. This may allow the battery components of the battery assembly to be easily and efficiently balanced. In some embodiments, the backplane may comprise cooling mechanisms configured to regulate the temperature of the battery terminals that are electrically coupled to the backplane.

Figure 1:
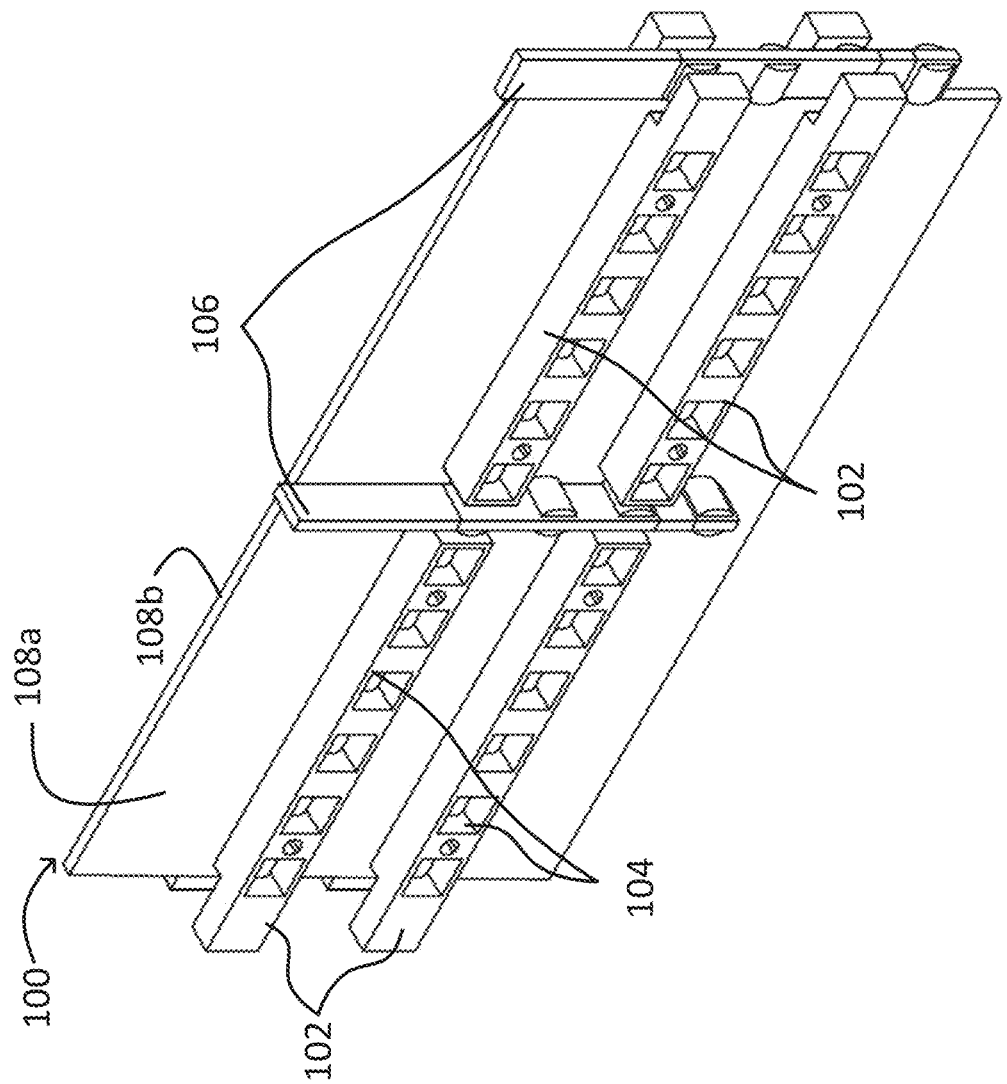
FIG. 1 shows a battery assembly architecture comprising a backplane, according to some embodiments of the present disclosure.

FIGS. 1A-1B show a battery assembly architecture comprising a backplane. Specifically, FIGS. 1A-1B shows a backplane 100. In some embodiments, backplane 100 may be configured to provide an electrical connection to and/or from one or more battery components. In some embodiments, backplane 100 may allow for one or more properties of one or more connected battery components to be monitored. The one or more properties may include electrical performance properties as well as other properties such as temperature. In some embodiments, backplane 100 may provide a physical pathway for cooling one or more battery components that are electrically coupled to backplane 100.

In some embodiments, backplane 100 may be configured to provide an electrical connection to at least 2, 3, 4, 5, 6, 7, 8, 9, 10, 15, 20, or 25 battery components. In some embodiments, backplane 100 may be configured to provide an electrical connection to fewer than 2, 3, 4, 5, 6, 7, 8, 9, 10, 15, 20, or 25 battery components.

In some embodiments, backplane 100 may comprise a fire-resistant material. For instance, backplane 100 may be a metal-based backplane or a printed circuit board (PCB). In some embodiments, backplane 100 may comprise one or more circuits and/or sensors configured to monitor one or more properties of the battery components that are connected to backplane 100. In some embodiments, the one or more circuits and/or sensors may comprise circuits and/or sensors configured to monitor voltage, current, temperature, or gas levels (e.g., hydrogen levels or carbon monoxide levels).

In some embodiments, backplane 100 may provide an electrical connection to one or more battery components through a plurality of socket blocks 102. In some embodiments, socket blocks 102 may be metallic strips or bars mounted to one or more outside surfaces of backplane 100 and configured to distribute power throughout backplane 100. In some embodiments, socket blocks 102 may be mounted on a first outside surface 108a and a second outside surface 108b of backplane 100 so that battery components may be connected to backplane 100 from two different sides of backplane 100. In some embodiments, the plurality of socket blocks 102 may be positioned such that they are parallel to one another. In some embodiments, one or more of the plurality of socket blocks 102 may comprise a conductive material. In some embodiments, one or more of the plurality of socket blocks 102 may comprise copper, gold, aluminum, silver, and/or any other suitable conductive material.

Each of the plurality of socket blocks 102 may comprise a plurality of sockets 104. Each of the plurality of sockets 104 may be configured to receive a terminal of a battery component. In some embodiments, each socket block 102 may comprise at least 2, 3, 4, 5, 10, 15, 20, or 25 sockets 104. In some embodiments, each socket block 102 may comprise fewer than 2, 3, 4, 5, 10, 15, 20, or 25 sockets 104. Optionally, sockets 104 may have a square shape or a tapered shape.

In some embodiments, each of the plurality of sockets 104 may comprise one or more leaf springs (not shown). The leaf springs may be positioned on one or more exposed surfaces of each socket 104. In some embodiments, the leaf springs may provide a flexible connection between the socket blocks and the battery components inserted into the sockets. When a battery component terminal is inserted into a socket, the leaf spring in the socket may compress and may provide a large contact surface area between the battery component terminal and backplane 100 The leaf springs may accommodate dimensional or positional misalignment of battery components and ensure that battery components remain in contact with backplane 100 regardless of (possibly non-uniform) thermal expansion of backplane 100 with respect to the battery component. When a battery component terminal is removed from a socket, the leaf spring may provide a force to assist in efficient removal of the battery component.

In some embodiments, if a battery component terminal is removed from a socket, the leaf spring in the socket may expand to bridge the connection between the now-empty socket and the other battery components that are connected to the socket block. This may allow individual battery components to be removed and/or replaced without interrupting the electrical coupling between other battery components that are connected to backplane 100.

Figure 2B:
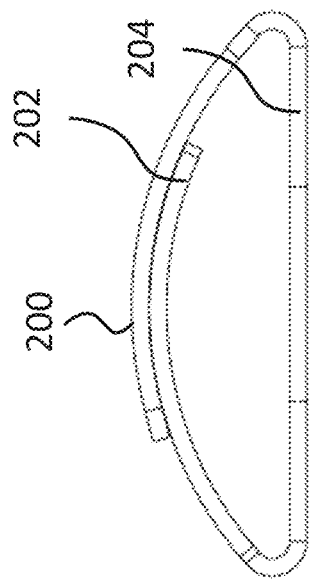
FIGS. 2A-2B show a leaf spring, according to some embodiments of the present disclosure.
Figure 2A:
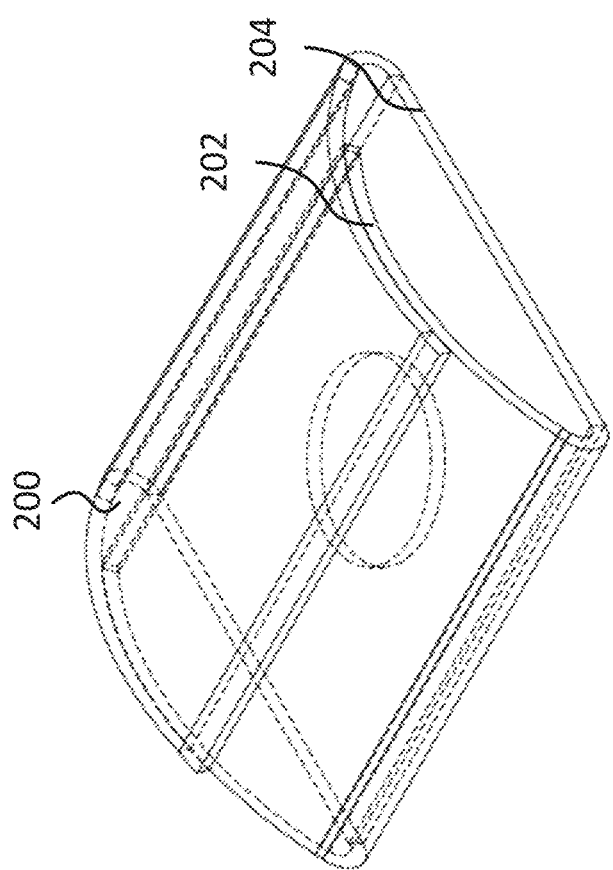

FIGS. 2A-2B show a perspective view (FIG. 2A) and a side view (FIG. 2B) of an exemplary leaf spring 200. Leaf spring 200 may comprise a first surface 202 and a second surface 204. When pressures applied to leaf spring 200, the first surface 202 may be configured to deform toward the second surface 204. The contact surface area between surface 202 and surface 204 may increase as pressures applied to leaf spring 200 increase.

In some embodiments, leaf spring 200 may comprise a conductive material. In some embodiments, leaf spring 200 may comprise copper, aluminum, gold, or silver. In some embodiments, leaf spring 200 may be bimetallic, i.e., may comprise a first layer comprising a first metal and a second layer comprising a second metal that is different from the first metal. The first metal and the second metal may expand at different rates in response to changes in the temperature of leaf spring 200. As such, when the temperature of leaf spring 200 exceeds a threshold temperature, leaf spring 200 may deform. In some embodiments, the first metal may comprise steel and the second metal may comprise copper.

In some embodiments, each of the plurality of sockets 104 may house a leaf spring that includes one or more features of leaf spring 200 shown in FIGS. 2A-2B. In particular, in some embodiments, one or more of the plurality of sockets 104 may comprise a bimetallic leaf spring. If the temperature of a battery component terminal inserted into a socket comprising a bimetallic leaf spring begins to increase (e.g., due to a chemical, electrical, or thermal issue within the battery component), then the bimetallic leaf spring may deform in in a direction away from the battery component terminal so that it breaks the electrical coupling between the battery component terminal and the backplane. This may provide protection against damage due to overheating and/or thermal runaway.

Figure 3:
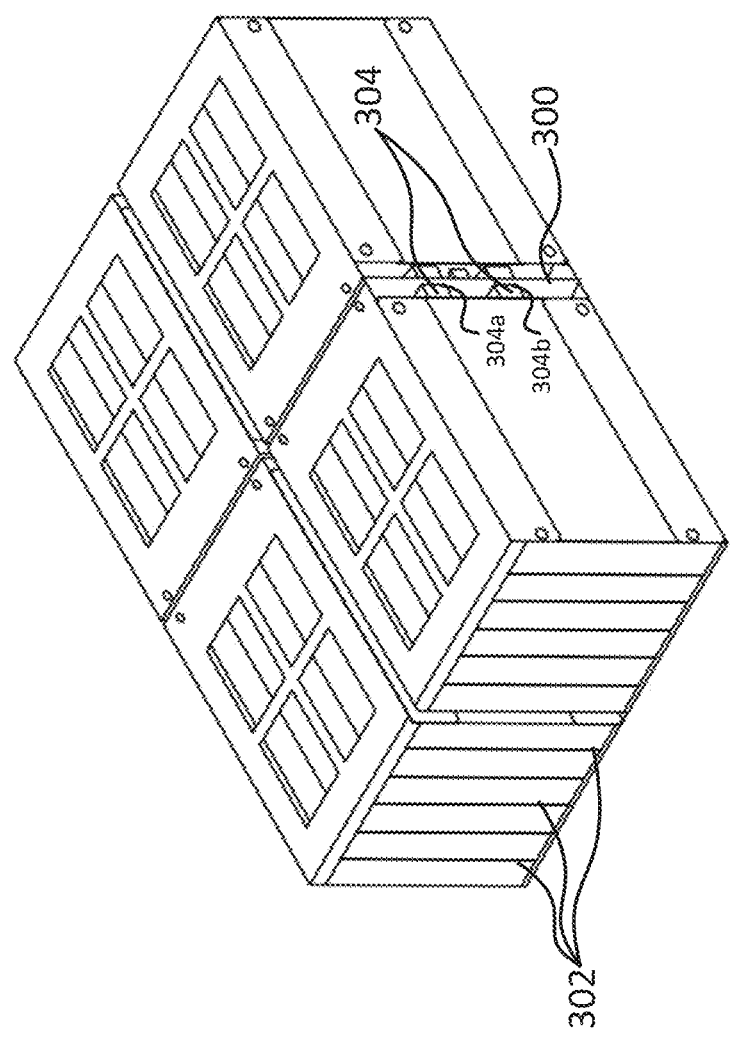
FIG. 3 shows a backplane connected to a plurality of batteries, according to some embodiments of the present disclosure.

FIG. 3 shows a backplane connected to a plurality of battery components, according to some embodiments of the present disclosure. Specifically, FIG. 3 shows a backplane 300 and a plurality of battery components 302. The terminals of the plurality of battery components 302 are inserted into socket blocks 304. In some embodiments, backplane 300 may include one or more features of backplane 100 shown in FIGS. 1A-1B. In some embodiments, socket blocks 304 may include one or more features of socket blocks 102 shown in FIGS. 1A-1B. In some embodiments, a first socket block 304a may receive the positive terminals of battery components 302. In some embodiments, a second socket block 304b may receive the negative terminals of battery components 302.

In some embodiments, backplane 100 may comprise one or more sliding bus bars 106. Sliding bus bars 106 may be conductive bars comprising one or more electrical connectors positioned on one or more outer surfaces of the bars. The electrical connectors may be configured to electrically couple to one or more of the plurality of socket blocks 102. In some embodiments, sliding bus bars 106 may be positioned orthogonal to the plurality of socket blocks 102. Sliding bus bars 106 may be positioned on one or more edges of backplane 100. In some embodiments, sliding bus bars 106 may comprise copper, gold, silver, or aluminum.

In some embodiments, sliding bus bars 106 may facilitate electrical coupling between one or more of the plurality of socket blocks 102. In some embodiments, sliding bus bars 106 may be configured to be movable between a first position and a second position with respect to the plurality of socket blocks 102 in order to control the type of electrical connection between the plurality of socket blocks 102 and, as a result, control the type of electrical connection between the battery components that are connected to the plurality of socket blocks 102. In other words, sliding bus bars 106 may be configured to control the electrical topology of backplane 100. In some embodiments, when sliding bus bars 106 are in a first position, the battery components that are coupled to the plurality of socket blocks 102 may be connected in parallel with one another. In some embodiments, when sliding bus bars 106 are in a second position, the battery components that are coupled to the plurality of socket blocks 102 may be connected in series with one another. In some embodiments, sliding bus bars 106 may allow users to change the electrical topology of backplane 100 without disconnecting or switching the physical positions of battery components.

Figure 4:
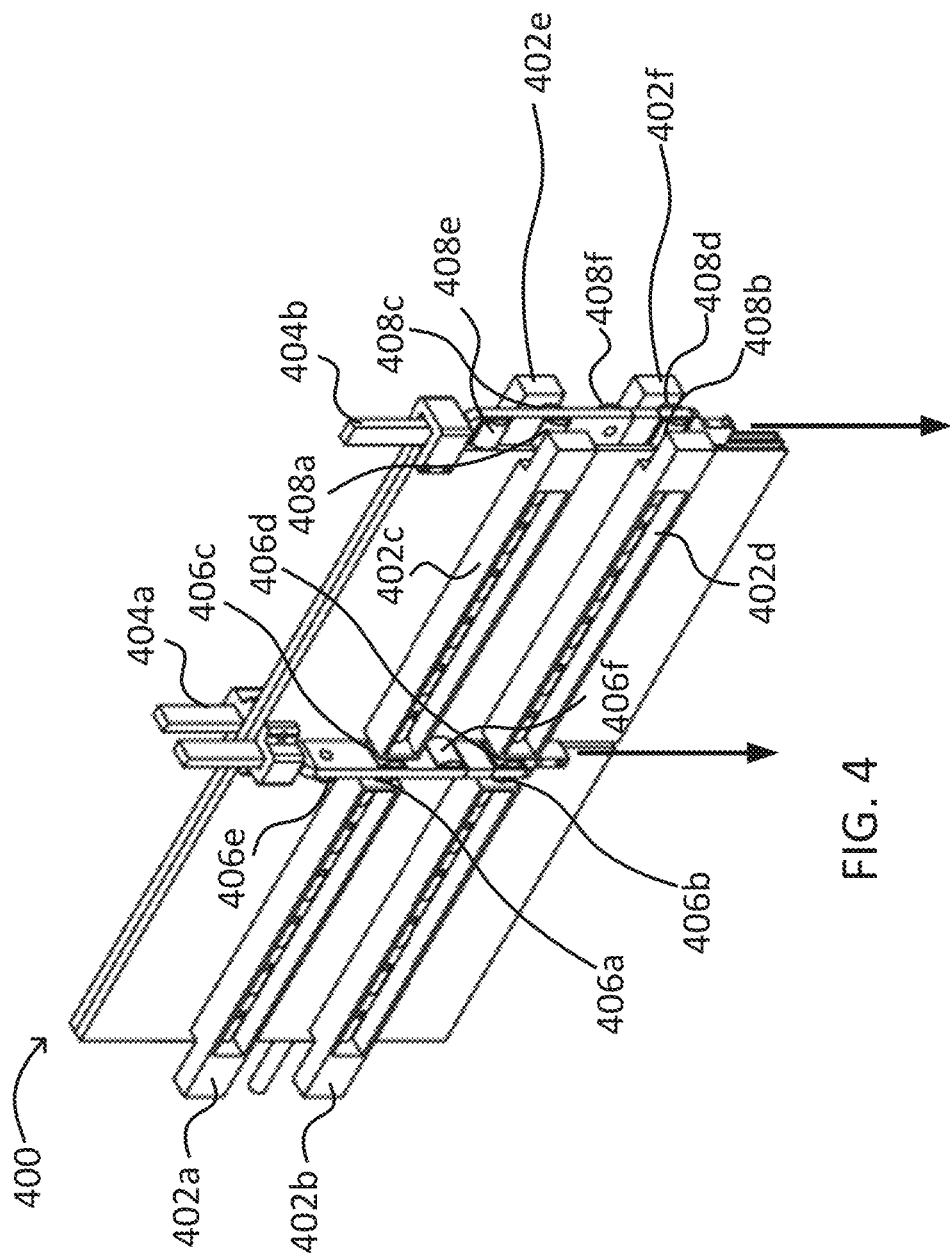
FIG. 4 shows a perspective view backplane comprising a plurality of sliding bus bars for controlling the backplane's electrical topology, according to some embodiments of the present disclosure.

FIG. 4 shows a perspective view of a backplane 400 comprising a plurality of sliding bus bars for controlling the backplane's electrical topology, according to some embodiments of the present disclosure. In some embodiments, backplane 400 may include one or more features of backplane 100 shown in FIG. 1. As shown, backplane 400 may comprise a first socket block 402a, a second socket block 402b, a third socket block 402c, a fourth socket block 402d, a fifth socket block 402e, and a sixth socket block 402f. Socket blocks 402a-d may be mounted to a first outside surface of backplane 400, while socket blocks 402e-f may be mounted to a second outside surface of backplane 400 that is opposite to the first outside surface. In some embodiments, socket blocks 402a-f may include one or more features of the plurality of socket blocks 102 of backplane 100 shown in FIG. 1.

In addition to socket blocks 402a-f, backplane 400 may comprise a first sliding bus bar 404a and a second sliding bus bar 404b. Sliding bus bars 404a-b may be positioned such that they are aligned orthogonal to socket blocks 402a-d. Sliding bus bar 404a may be positioned in the middle of backplane 400 between socket blocks 402a-b and socket blocks 402c-d. Sliding bus bar 404b may be positioned on an edge of backplane 400 between socket blocks 402c-d and socket blocks 402e-f. In some embodiments, sliding bus bars 404a-b may be rotated about their longest axis with respect to one another.

In some embodiments, sliding bus bars 404a-b may be configured to move between a first position and a second position with respect to socket blocks 402a-f. Sliding bus bar 404a may comprise a plurality of electrical connectors 406a-f. Depending on the position of sliding bus bar 404a, one or more of the plurality of electrical connectors 406a-f may electrically couple to one or more of socket blocks 402a-d, thereby facilitating an electrical connection between one or more of socket blocks 402a, 402b, 402c, and 402d. Moving sliding bus bar 404a between a first position to a second position may control which of the plurality of electrical connectors 406a-f are connected to which socket blocks 406a-d. As a result, the configuration of the electrical connections between socket blocks 406a-d may change.

Similarly, sliding bus bar 404b may comprise a plurality of electrical connectors 408a-f. Depending on the position of sliding bus bar 404b, one or more of the plurality of electrical connectors 408a-f may electrically couple to one or more of socket blocks 402c-f, thereby facilitating an electrical connection between one or more of socket blocks 402c, 402d, 402e, and 402f. Moving sliding bus bar 404b between a first position to a second position may control which of the plurality of electrical connectors 408a-f are connected to which socket blocks 406c-f. As a result, the configuration of the electrical connections between socket blocks 406c-f may change.

Figure 5A:
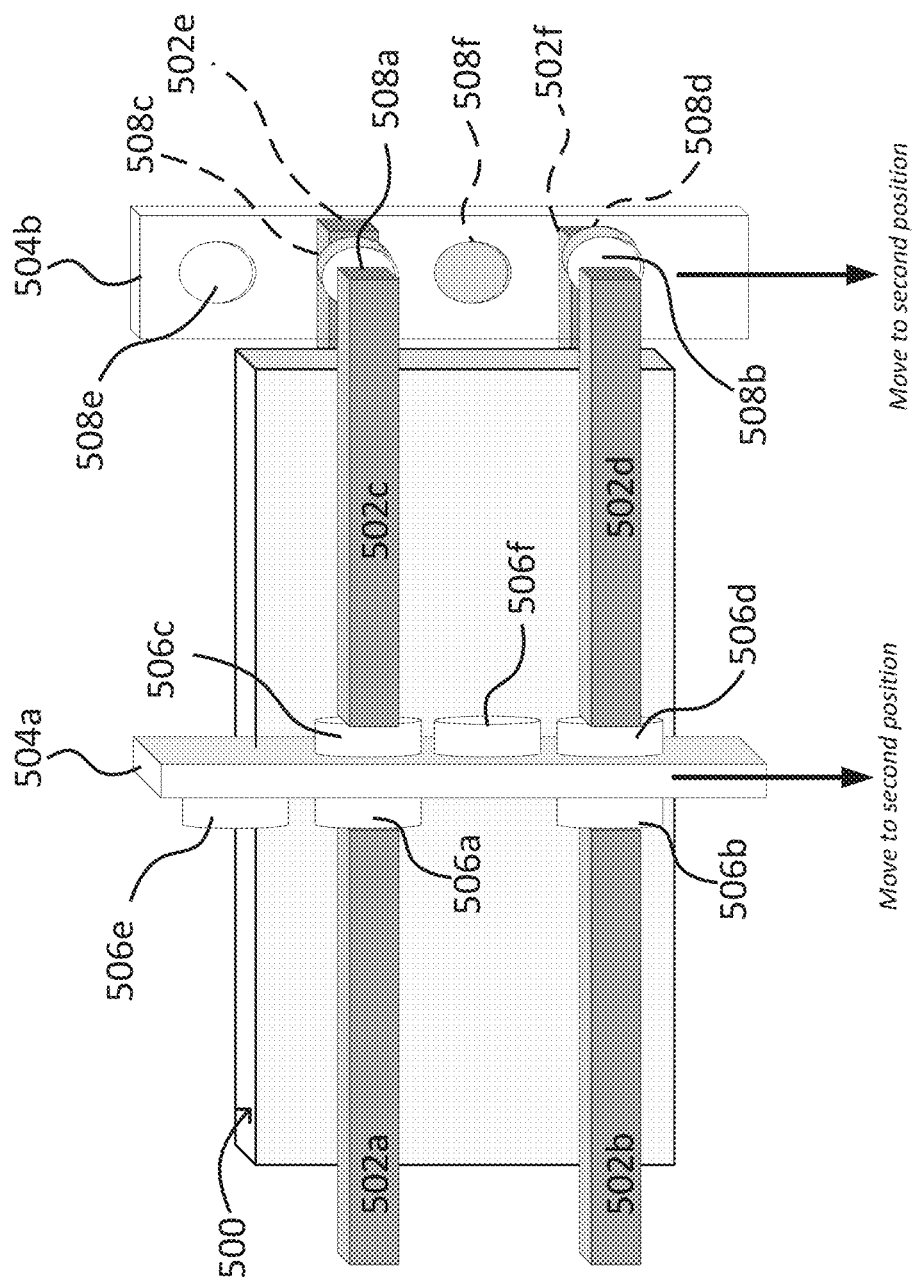
FIGS. 5A-5C show a front view backplane with sliding bus bars in a first position, in a second position, and in a third position, according to some embodiments of the present disclosure.
Figure 5B:
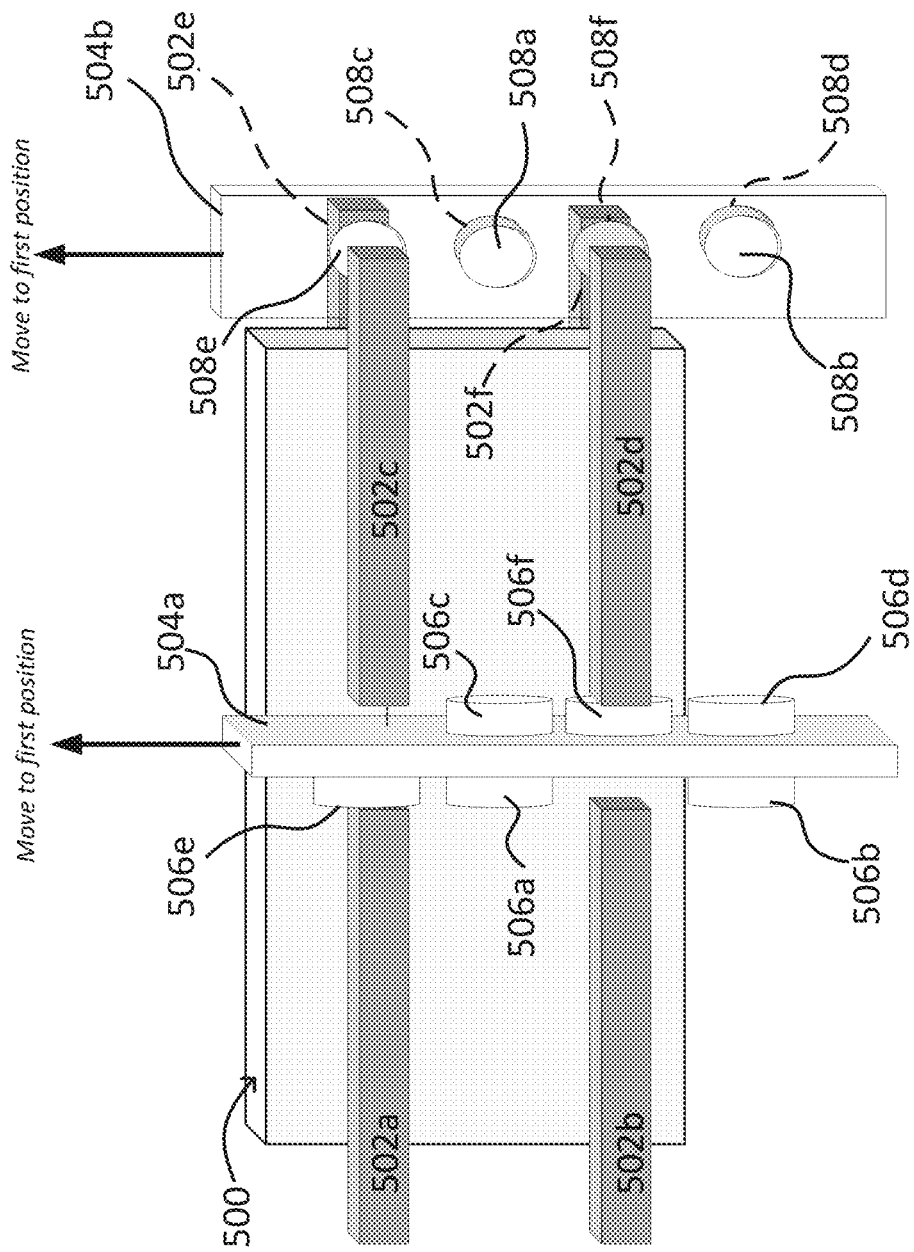

FIGS. 5A-5B show a front view backplane 500 with sliding bus bars in first position (FIG. 5A) and in a second position (FIG. 5B), according to some embodiments of the present disclosure. Like backplane 400 shown in FIG. 4, backplane 500 may comprise a first socket block 502a, a second socket block 502b, a third socket block 502c, a fourth socket block 502d, a fifth socket block 502e, and a sixth socket block 502f. Socket blocks 502a-d may be mounted to a first outside surface of backplane 500, while socket blocks 502e-f may be mounted to a second outside surface of backplane 500 that is opposite to the first outside surface. In some embodiments, socket blocks 502a-f may include one or more features of socket blocks 402a-f of backplane 400 shown in FIG. 4.

As shown, backplane 500 may comprise a first sliding bus bar 504a and a second sliding bus bar 504b. Sliding bus bar 504a may be positioned in the middle of backplane 500 between socket blocks 502a-b and socket blocks 502c-d. Sliding bus bar 504b may be positioned on an edge of backplane 500 between socket blocks 502c-d and socket blocks 502e-f. In some embodiments, sliding bus bars 504a-b may be rotated about their longest axis with respect to one another.

In some embodiments, sliding bus bars 504a-b may include one or more features of sliding bus bars 404a-b of backplane 400 shown in FIG. 4. Specifically, sliding bus bar 504a may comprise a plurality of electrical connectors 506a-f. Depending on the position of sliding bus bar 504a, one or more of the plurality of electrical connectors 506a-f may electrically couple to one or more of socket blocks 502a-d, thereby providing an electrical connection between one or more of socket blocks 502a, 502b, 502c, and 502d. Similarly, sliding bus bar 504b may comprise a plurality of electrical connectors 508a-f. Depending on the position of sliding bus bar 504b, one or more of the plurality of electrical connectors 508a-f may electrically couple to one or more of socket blocks 502c-f, thereby providing an electrical connection between one or more of socket blocks 502c, 502d, 502e, and 502f.

As mentioned above, FIG. 5A shows backplane 500 when sliding bus bars 504a-b are in a first position with respect to socket blocks 502a-f. When sliding bus bar 504a is in the first position, socket block 502a may be electrically coupled to electrical connector 506a, socket block 502b may be electrically coupled to electrical connector 506b, socket block 502c may be electrically coupled to electrical connector 506c, and socket block 502d may be electrically coupled to electrical connector 506d. In some embodiments, battery components that are coupled to socket blocks 502a-502d may be connected in parallel when sliding bus bar 504a is in the first position. Similarly, when sliding bus bar 504b is in the first position, socket block 502c may be electrically coupled to electrical connector 508a, socket block 502d may be electrically coupled to electrical connector 508b, socket block 502e may be electrically coupled to electrical connector 508c, and socket block 502f may be electrically coupled to electrical connector 508d. In some embodiments, battery components that are coupled to socket blocks 502c-f may be connected in parallel when sliding bus bar 504b is in the first position.

FIG. 5B shows backplane 500 when sliding bus bars 504a-b are in a second position with respect to socket blocks 502a-f. When sliding bus bar 504a is in the second position, socket block 502a may be electrically coupled to electrical connector 506e and socket block 502d may be electrically coupled to electrical connector 506f. When sliding bus bar 504a is in the second position, socket blocks 502b-c may not be electrically coupled to socket block 504a. In some embodiments, battery components that are coupled to socket blocks 502a-d may be connected in series when sliding bus bar 504a is in the second position. Similarly, when sliding bus bar 504b is in the second position, socket block 502c may be electrically coupled to electrical connector 508e and socket block 502f may be electrically coupled to electrical connector 508f. When sliding bus bar 504b is in the second position, socket blocks 502d-e may not be electrically coupled to socket block 504b. In some embodiments, battery components that are coupled to socket blocks 502c-f may be connected in series when sliding bus bar 504b is in the second position.

Figure 5C:
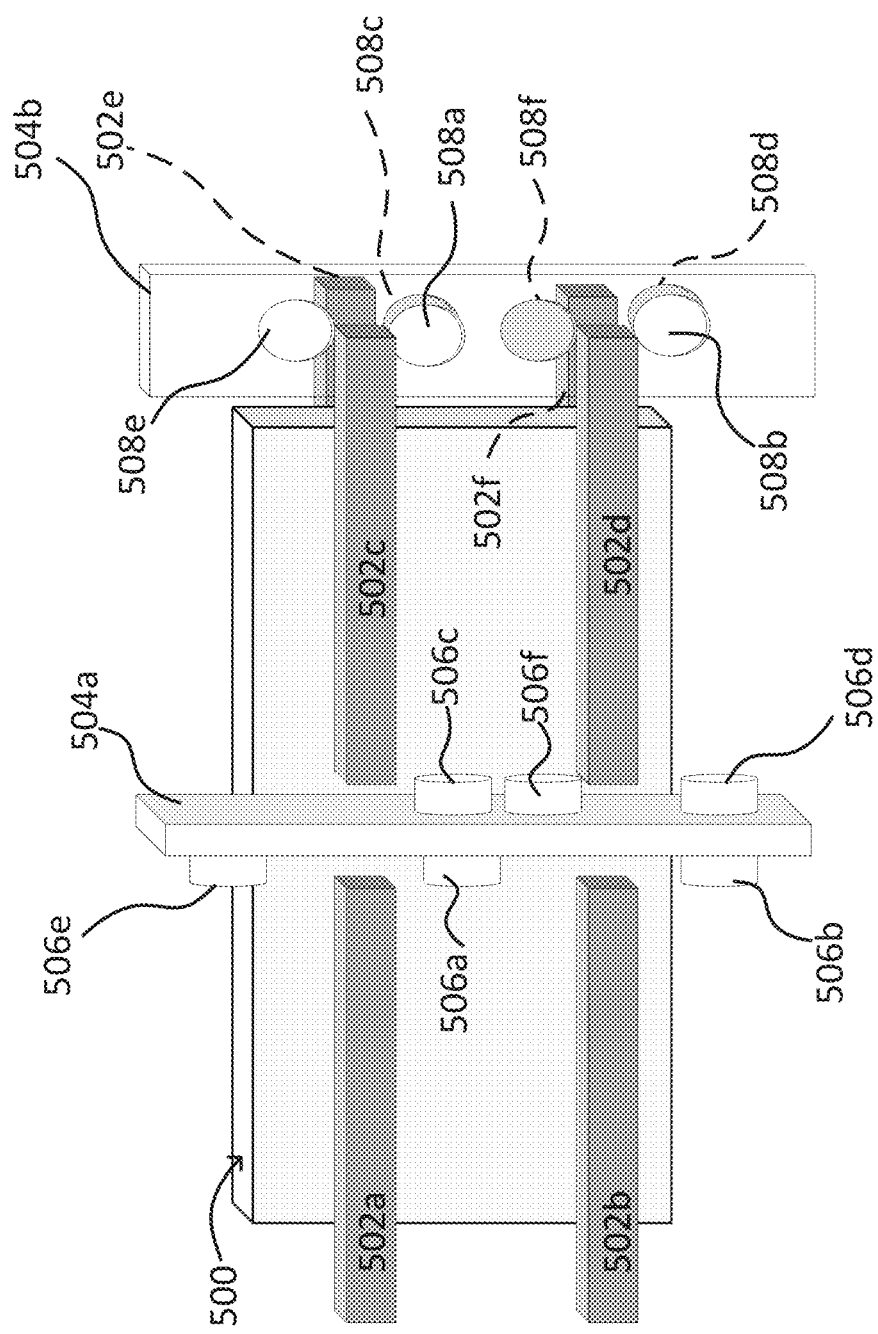

In some embodiments, when sliding bus bars 504a-b are between the first position (shown in FIG. 5A) and the second position (shown in FIG. 5B), they may occupy a third, intermediate position, as shown in FIG. 5C. When sliding bus bar 504a is in the third position with respect to socket blocks 502a-f, socket blocks 502a-b may be disconnected from electrical connectors 506a-f. Likewise, when sliding bus bar 504b is in the third position with respect to socket blocks 502a-f, socket blocks c-f may be disconnected from electrical connectors 508a-f. Thus, when sliding bus bars 504a-b are in the third position, socket blocks 504a-f may be disconnected from one another.

Figure 6:
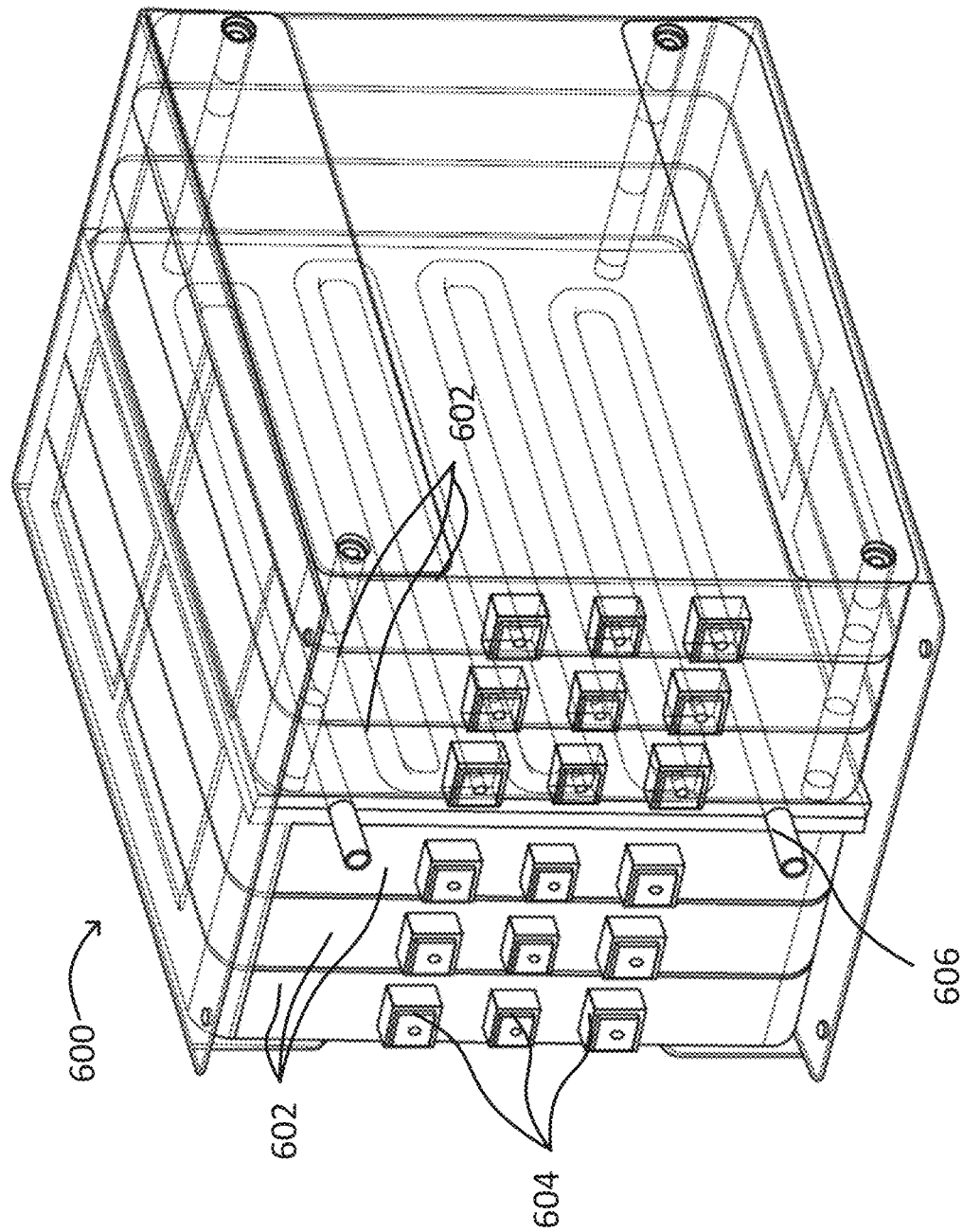
FIG. 6 shows an exemplary cooling system for a battery assembly, according to some embodiments of the present disclosure.

In some embodiments, backplane 100 may be configured to connect to a cooling system for regulating the temperature of the battery components that are connected to backplane 100. FIG. 6 shows an exemplary cooling system for a battery assembly 600. The plurality of battery components 602 may be connected to a backplane such as backplane 100 shown in FIG. 1. Specifically, the terminals 604 of the battery components 602 may be electrically coupled to socket blocks (e.g., socket blocks 102 shown in FIG. 1) of the backplane. In some embodiments, a plurality of coolant pipes 606 may be aligned along one or more surfaces of each of one or more of the plurality of battery components 602. For example, coolant pipes 606 may be embedded within a plate that is aligned along a surface of a battery component 602. Alternatively, coolant pipes 606 may be embedded within a battery component 602. Coolant pipes 606 may be copper pipes. Coolant pipes 606 may provide a flow path for a coolant. In some embodiments, the coolant may be a single-phase (liquid) fluid or a two-phase (liquid-vapor) fluid that is configured to draw heat away from the terminals 604 of battery components 602. Battery assembly 600 may comprise a pump configured to drive the flow of the coolant through coolant pipes 606. The pump may be controlled by a fluid control module. The fluid control module may include one or more temperature sensors configured to monitor the temperatures of battery components 602 and may adjust the flow of the coolant through coolant pipes 606 based on the temperatures of the plurality of battery components 602.

Figure 7:
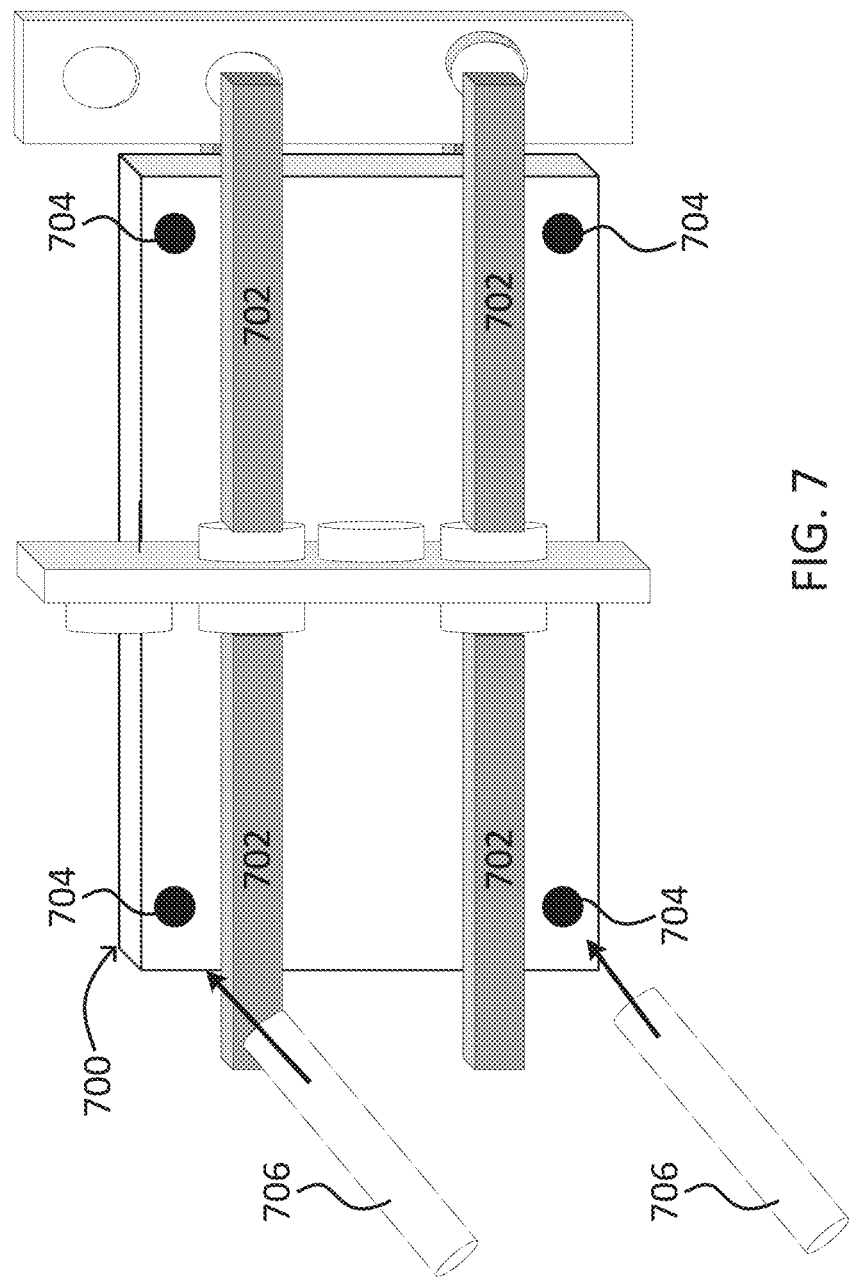
FIG. 7 shows a backplane comprising a plurality of through-holes with quick-disconnect couplings configured to receive coolant pipes, according to some embodiments of the present disclosure.

In some embodiments, the backplane that battery components 602 may be configured to allow coolant pipes 606 to pass through from a first side of the backplane to the opposite side of the backplane. FIG. 7 illustrates a backplane 700 comprising a plurality of socket blocks 702 configured to electrically couple to terminals of a plurality of battery components and a plurality of through-holes 704 with quick-disconnect couplings configured to receive coolant pipes 706. Through-holes 704 may provide a passage for coolant pipes 706 to allow coolant pipes 706 to draw heat away from battery components connected on both sides of backplane 700. In some embodiments, each through-hole 704 may include a valve that is configured to close to prevent the flow of coolant whenever backplane 700 is not coupled to any battery components.

Figure 8:
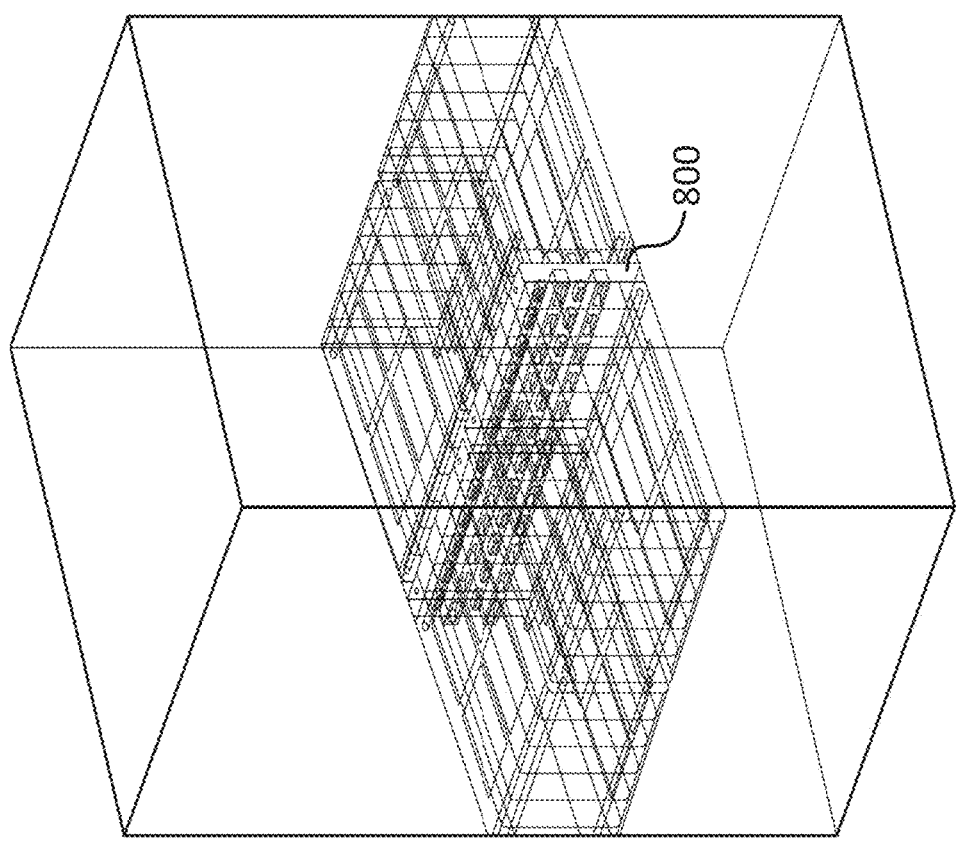
FIG. 8 shows a perspective view of a vertical position of a stacked backplane, according to some embodiments of the present disclosure.

In some embodiments, backplane 100 may be configured to be stackable (e.g., using a system of shelves). FIG. 8 shows a perspective view of a vertical position of a stacked backplane 800. In some embodiments, backplane 800 (and the other backplanes stacked above and below backplane 800) may include one or more features of backplane 100 shown in FIG. 1. In some embodiments, one or more sliding bus bars (e.g., sliding bus bars 106) may be configured to simultaneously control the electrical topology (i.e., whether the battery components connected to the backplanes are connected in series or in parallel) of the entire stack of backplanes. In some embodiments, each rack in a shelf may comprise a pair of backplanes.

In some embodiments, backplane 100 may include one or more overcurrent protection devices (OCPD). The OCPDs may comprise circuit breakers or fuses. If a current through components of backplane 100 (e.g., a socket block) exceeds a threshold current value, an OCPD may be configured to disconnect backplane 100 from the current source (e.g., a faulty battery component).

Any one or more characteristics of any of the embodiments (including claims) described, shown, and/or referenced herein may be combined, in whole or in part, with any one or more characteristics of any one or more other embodiments (including claims) described, shown, and/or referenced herein.

This disclosure includes methods of making and methods of using any of the systems or devices provided herein, for example including inserting and/or removing battery modules from a backplane as provided, adjusting a position of a slidable bus bar of a backplane as provided, and/or including controlling flow of coolant fluid through a backplane as provided.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A backplane comprising:
 a surface;
 a plurality of socket blocks configured to electrically couple respectively to a plurality of battery components, the plurality of socket blocks mounted on the surface; and
 a plurality of sliding bus bars, each of the sliding bus bars configured to be independently movable with respect to the plurality of socket blocks and with respect to the surface, wherein a first sliding bus bar of the plurality of sliding bus bars is movable between:
  a first position with respect to the plurality of socket blocks and with respect to the surface, and
  a second position with respect to the plurality of socket blocks and with respect to the surface, wherein:
   when the first sliding bus bar is in the first position, the plurality of socket blocks are electrically coupled to one another in a first electrical configuration; and
   when the first sliding bus bar is in the second position, the plurality of socket blocks are electrically coupled to one another in a second electrical configuration.

2. The backplane of claim 1, wherein, when the plurality of socket blocks are electrically coupled to one another in the first electrical configuration, one or more of the plurality of socket blocks are electrically coupled in series.

3. The backplane of claim 1, wherein, when the plurality of socket blocks are electrically coupled to one another in the second electrical configuration, one or more of the plurality of socket blocks are electrically coupled in parallel.

4. The backplane of claim 1, comprising a plurality of through-holes configured to receive a plurality of coolant pipes configured to provide a flow path for a coolant, wherein the plurality of coolant pipes are configured to thermally couple to corresponding coolant pipes in one or more of the plurality of battery components.

5. The backplane of claim 4, wherein the plurality of coolant pipes comprise a thermally conductive material.

6. The backplane of claim 5, wherein the plurality of coolant pipes comprise copper.

7. The backplane of claim 4, wherein the coolant comprises a single-phase fluid.

8. The backplane of claim 4, wherein the coolant comprises a two-phase fluid.

9. The backplane of claim 4, wherein one or more of the plurality of through-holes comprises a valve configured to close to prevent flow of coolant when a socket block corresponding to the valve is not electrically coupled to a battery component and configured to open to allow flow of coolant when the socket block is electrically coupled to the battery component.

10. The backplane of claim 1, wherein one or more of the plurality of socket blocks comprises a plurality of sockets configured to receive terminals of one or more of the plurality of battery components.

11. The backplane of claim 10, comprising one or more flexible members positioned within one or more of the plurality of sockets, wherein the one or more flexible members are configured to provide a flexible contact area between the terminals of one or more of the plurality of battery components and the backplane.

12. The backplane of claim 11, wherein the one or more flexible members comprise leaf springs.

13. The backplane of claim 11, wherein, when a terminal of the plurality of battery components is removed from a socket of the plurality of sockets, the flexible member positioned within the socket is configured to electrically connect an electrical connection across the socket block.

14. The backplane of claim 10, wherein a first socket block of the plurality of socket blocks comprises sockets that open in a first direction and a second socket block of the plurality of socket blocks comprises sockets that open in the first direction such that battery components whose terminals are inserted into the sockets of the first socket block face the same direction as battery components whose terminals are inserted into the sockets of the second socket block.

15. The backplane of claim 14, wherein the first sliding bus bar is positioned between the first socket block and the second socket block.

16. The backplane of claim 14, wherein the first socket block and the second socket block are positioned in a first plane.

17. The backplane of claim 16, wherein the first sliding bus bar is positioned in the first plane with the first socket block and the second socket block.

18. The backplane of claim 10, wherein a first socket block of the plurality of socket blocks comprises sockets that open in a first direction and a second socket block of the plurality of socket blocks comprises sockets that open in a second direction such that battery components whose terminals are inserted into the sockets of the first socket block face in an opposite direction to battery components whose terminals are inserted into the sockets of the second socket block.

19. The backplane of claim 18, wherein the first socket block is positioned in a first plane and the second socket block is positioned in a second plane.

20. The backplane of claim 19, wherein the first sliding bus bar is positioned in a third plane and is configured to form an electrical connection between the first plane and the second plane.

21. The backplane of claim 1, wherein the first sliding bus bar comprises a first set of electrical connectors configured to electrically couple one or more of the plurality of socket blocks when the first sliding bus bar is in the first position and a second set of electrical connectors configured to electrically couple one or more of the plurality of socket blocks when the first sliding bus bar is in the second position.

22. The backplane of claim 1, wherein, when the first sliding bus bar is moved from the first position to the second position, the first sliding bus bar occupies a third position with respect to the plurality of socket blocks wherein the plurality of socket blocks are not electrically coupled to one another.

23. The backplane of claim 1, wherein:
the plurality of socket blocks comprises a first socket block and a second socket block;
the backplane further comprises a second surface and a third socket block mounted on the second surface;
the first sliding bus bar is positioned between the first socket block and the second socket block;
a second sliding bus bar of the plurality of sliding bus bars is movable between third and fourth positions; and
the second sliding bus bar is positioned between the second socket block and the third socket block.

24. The backplane of claim 1, wherein:
the first sliding bus bar is at a first orientation with respect to the plurality of socket blocks and with respect to the surface,
a second sliding bus bar of the plurality of sliding bus bars is at a second orientation with respect to the plurality of socket blocks and with respect to the surface, and
the first orientation and the second orientation are different.

* * * * *